(12) United States Patent
Haga

(10) Patent No.: US 7,739,315 B2
(45) Date of Patent: Jun. 15, 2010

(54) DATA STORAGE APPARATUS, DATA STORAGE METHOD AND IMAGE PROCESSING APPARATUS FOR SECURE DATA DELETION

(75) Inventor: Tatsuyoshi Haga, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 314 days.

(21) Appl. No.: 11/837,343

(22) Filed: Aug. 10, 2007

(65) Prior Publication Data

US 2008/0215598 A1    Sep. 4, 2008

(30) Foreign Application Priority Data

Sep. 12, 2006  (JP)  ............................. 2006-247026

(51) Int. Cl.
*G06F 7/00* (2006.01)
*G06F 17/30* (2006.01)

(52) U.S. Cl. ...................................... 707/812

(58) Field of Classification Search ........................ None
See application file for complete search history.

(56) References Cited

U.S. PATENT DOCUMENTS

| | | | |
|---|---|---|---|
| 5,715,424 A * | 2/1998 | Jesionowski et al. ........... 714/24 |
| 2002/0036965 A1 * | 3/2002 | Lee ........................... 369/53.22 |
| 2007/0208915 A1 * | 9/2007 | Tran et al. .................... 711/159 |

* cited by examiner

*Primary Examiner*—Uyen T. Le
(74) *Attorney, Agent, or Firm*—Finnegan, Henderson, Farabow, Garrett & Dunner, L.L.P.

(57) ABSTRACT

In a data storage apparatus for storing data by making the data to be a file, a file is deleted, in a normal deletion processing, after contents of the file are destructed by overwriting the file to be deleted with data for elimination such as "all-zeros". On the other hand, with respect to storage processing, when storing new data, files waiting for deletion are investigated whether they are existent or not, excluding files being deleted currently in the normal deletion processing, and when files waiting for deletion are existent, either one of the files waiting for deletion is overwritten with new data to be stored.

20 Claims, 8 Drawing Sheets

DATA STORAGE APPARATUS, DATA STORAGE METHOD AND IMAGE PROCESSING APPARATUS FOR SECURE DATA DELETION

This application is based on Japanese Patent Application No. 2006-247026 filed on Sep. 12, 2006 in Japanese Patent Office, the entire content of which is hereby incorporated by reference.

BACKGROUND OF THE INVENTION

The present invention relates to a data storage apparatus for storing data in a form of a file, and in particular, to a technology for deleting a file efficiently while avoiding leaks of confidential information.

When storing data in a storage device such as a hard disc device, control information showing identification names (file names) of data, positions of storage and sizes are usually stored simultaneously in addition to substantive data. Since reading of the data is conducted by referring to the control information, deletion of the stored data is carried out by deleting the control information of the data, and the substantive data are not deleted.

However, in the method of deletion of this kind, if an special software is used, the data which ought to have been deleted can be read after being revived, because the substantive data still remain without being deleted. This is not preferable in view of the point of avoiding leaks of confidential information, when an occasion where data are stolen together with a hard disc device is assumed.

On the other hand, for deleting substantive data, a method to overwrite the total area to be delete with specific eliminating data such as "all-zeros", "all-ones" or a random value is used in many cases, and a load of processing for deletion of the substantive data is large. For example, a digital copying machine includes a machine model that stores image data inputted from a scanner or an outer interface in a hard disc device temporarily, and then, reads them out to conduct operations for printout, and deletes the substantive data of image data after outputting for preventing leaks of secrets. When an amount of data is increased by requirements of colorizing, higher resolution and speeding up, the processing of deleting the substantive data starts to fail to deal with, resulting in a fear that productivity of operation such as copying operation is lowered.

Therefore, there is proposed an image processing apparatus wherein, when conducting storage of new data in the course of practicing data deletion processing, storage of new data and deletion of the substantive data of former data are carried out simultaneously by interrupting currently-running processing for deletion, and by storing new data in the area that follows the position of the interruption (for example, see Patent Document 1).

However, in the method to interrupt currently-running processing for deletion, and to store new data on a portion following the position of the interruption, the deleting processing and storing processing need to operate in cooperation with each other, resulting in complicated processing. Meanwhile, in the image processing apparatus disclosed in Patent Document 1, image data are stored in a continuous storage area. However, when storing data as a file by using a file system, actual data are sometimes stored in fragmented areas, and file control becomes complicated, if new data are stored from halfway of a file being deleted.

[Patent Document 1] Japanese Patent Publication Open to Public Inspection No. 2005-159550

SUMMARY

The invention is to solve the aforesaid problem, and its objective is to provide a data storage apparatus and to provide a data storing method capable of deleting a file efficiently while preventing leaks of confidential information.

The points of the invention for achieving the aforesaid objectives lie in the following respective embodiments of the invention.

[A] A data storage apparatus for storing data in a form of a file, having therein a storage section for storing data and a control section that controls storage and deletion of data for the storage section, wherein, the control section checks whether there is a file waiting for deletion or not when storing data, and when there is a file waiting for deletion, the control section overwrites either file waiting for deletion using the aforesaid data to store the data.

[B] A data storage method characterized in that, when data are stored as a file, the file waiting for deletion is checked whether it exists or not, and when the file waiting for deletion exists, either one of files waiting for deletion is overwritten using the aforesaid data, for storage of the data.

[C] An image processing apparatus for processing image data including a storage section for storing input image data and a control section for controlling the storage section to store and delete the image data, wherein when storing the image data, the control section judges whether a file waiting to be deleted exists or not and when the file waiting to be deleted exists, the control section overwrites the waiting file with the image data to be stored.

DETAILED DESCRIPTION OF THE PREFERRED EMBODIMENT

Figure 1:
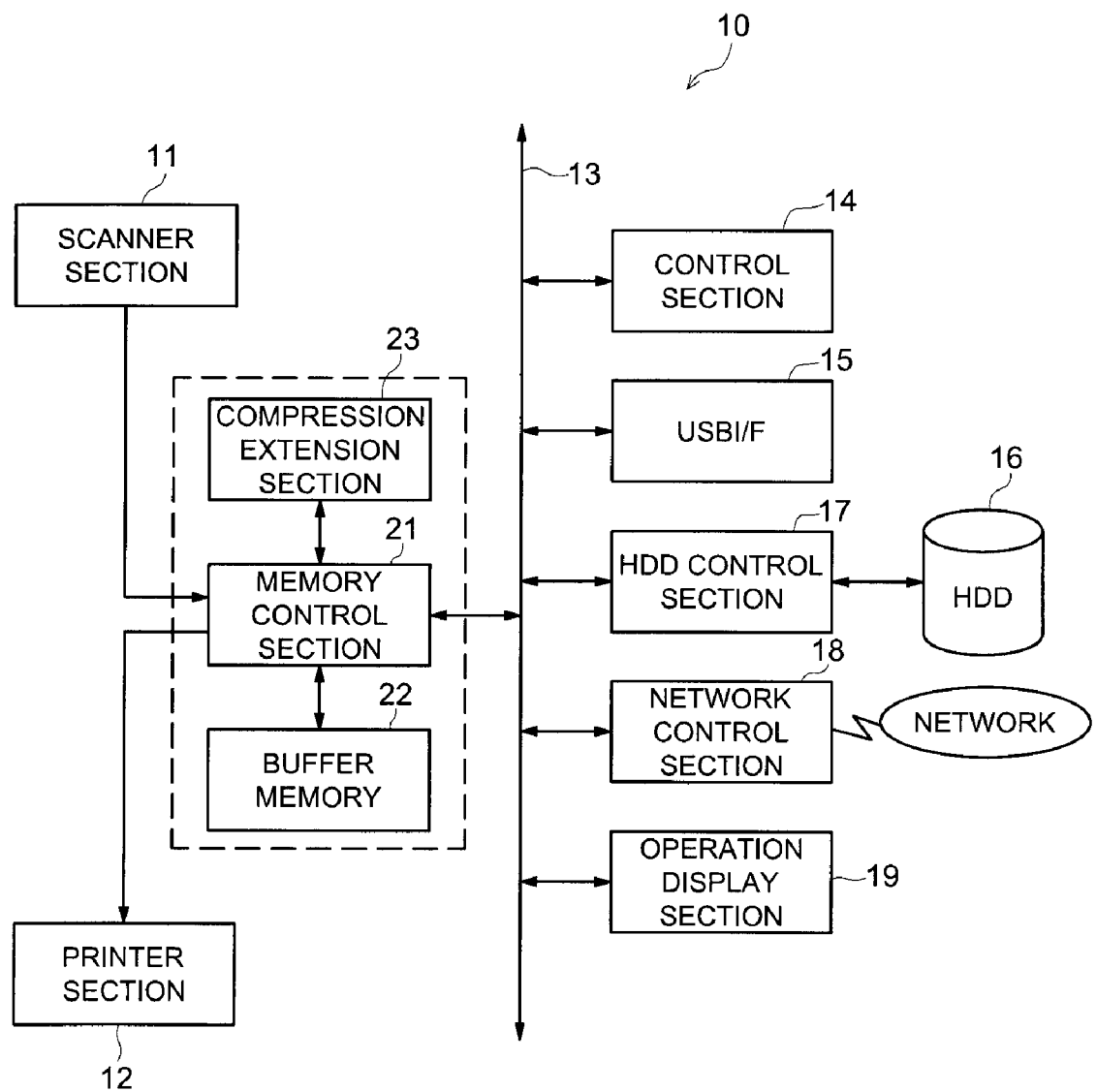
FIG. 1 is a block diagram showing a schematic structure of an image processing apparatus equipped with a data storage apparatus relating to an embodiment of the invention.

In the aforesaid [A], [B] and [C], when storing data newly, if there are files waiting for deletion, any file waiting for deletion is overwritten using data to be stored. Owing to this, storage of data can serve for destruction (actual deletion) of contents of the file waiting for deletion, and deletion of file of high security can be carried out efficiently. Further, since the file waiting for deletion can be an object to be overwritten instead of a file being deleted, ordinary deletion processing and storage processing by overwriting can be conducted independently, and processing can be simplified.

Other examples of the invention will be described as follows.

[1] The data storage apparatus described in [A] characterized in that the aforesaid control section selects the file waiting for deletion, whose size is close to the size of the aforesaid data, as a file for overwriting storage of the aforesaid data, when there are plural files waiting for deletion.

In the aforesaid invention, among files waiting for deletion, the file whose size is close the size of data to be stored is selected to the file to be overwritten. With respect to the difference between the size of the data to be stored and the file size, when the file size is smaller than the data size, file extension processing and processing for securing a storage area for shortfall are needed, while, when the file size is greater than the data size, a separate processing to delete an excessive area of the file with data for elimination such as "all-zeros" is needed, thus, a processing burden is reduced when the difference is smaller.

[2] The data storage apparatus described in [A] characterized in that the aforesaid control section selects the file waiting for deletion, whose size is smaller than and is close to the size of the aforesaid data, as a file for overwriting storage of the aforesaid data, when there are plural files waiting for deletion.

In the aforesaid invention, by selecting a file whose size is smaller than and is close to the size of data to be stored as the file to be overwritten from among files waiting for deletion, data are overwritten on the total area of the file by storage processing of data. Therefore, a separate processing to overwrite with data for elimination such as "all-zeros" is not needed.

[3] The data storage apparatus described in [A] characterized in that, when there exist a plurality of files waiting for deletion, the aforesaid control section selects a file for being overwritten and storing the aforesaid data in the order that is opposite to the order in which normal deletion processing selects a file to be deleted from files waiting for deletion.

In the aforesaid invention, conflict between file selection caused by an ordinary deletion processing and file selection for overwriting storage is hardly caused.

[4] The data storage method described in [B] characterized in that, when there exist a plurality of files waiting for deletion, a file waiting for deletion whose size is close to the size of the aforesaid data is selected as a file for being overwritten and storing the aforesaid data.

[5] The data storage method described in [B] characterized in that, when there exist a plurality of files waiting for deletion, a file waiting for deletion whose size is smaller than and is close to the size of the aforesaid data is selected as a file for being overwritten and storing the aforesaid data.

[6] The data storage method described in [B] characterized in that, when there exist a plurality of files waiting for deletion, a file for being overwritten and storing the aforesaid data is selected in the order that is opposite to the order of selection in which the normal deletion processing for deleting the file by being overwritten using a prescribed data for elimination selects a file to be deleted from files waiting for deletion.

[7] The image processing apparatus described in [C] characterized in that, when file waiting to be deleted does not exist, the control section creates a new file in a directory for storing and stores the input data in the new file.

[8] The image processing apparatus described in [C] which stores image data read by an image reading apparatus or image data sent from outside through a network in the storage section as input image data.

[9] The image processing apparatus described in [C] characterized in that, when a plurality of files waiting to be deleted exist, the control section selects a file waiting to be deleted for being overwritten by the data, a size of the file being similar to a size of the data.

[10] The image processing apparatus described in [C] characterized in that, when a plurality of files waiting to be deleted exist, the control section overwrites a file waiting to be deleted of latest order to be deleted by using the image data.

An embodiment of the invention will be described as follows, referring to the drawings.

FIG. 1 shows a schematic structure of image processing apparatus 10 equipped with a data storage apparatus relating to the embodiment of the invention. The image processing apparatus 10 is constructed as a digital copying machine that conducts copying operations to read a document and to form its duplication image for outputting, and scanner section 11 that reads a document and printer section 12 that forms an image on a recording sheet based on image data are equipped on the image processing apparatus 10.

Though an illustration of the inside of the scanner section 11 is omitted in FIG. 1, the scanner section 11 is equipped with a light source that illuminates a document, a line image sensor that reads one line part of the document in the direction of a width of the document, a moving mechanism that moves a reading position for each line part in the direction of a length of the document and an optical parts composed of a lens and a mirror which guide a reflected light coming from a document to the line image sensor for forming images. The line image sensor is composed of CCD (Charge Coupled Device) and it is equipped with an A/D converter that converts analog image signals outputted by the line image sensor into digital image data. Further, the scanner section 11 is equipped with an unillustrated automatic document feeder for reading a document of plural sheets continuously.

The printer section 12 has therein a conveyance device for recording sheets, a photoconductor drum, a charging device, a laser unit, a developing apparatus, a transfer separation device, a cleaning device and a fixing device, which are not illustrated, and it is constructed as a printer engine of a laser type that forms images on a recording sheet through an electrophotographic process.

Further, the image processing apparatus 10 has system bus 13 to which control section 14 that controls operations of the image processing apparatus 10 on an overall basis, USB I/F 15 to which a USB (Universal Serial Bus) device such as USB memory is connected, HDD control section 17 that controls data reading and writing and data transfer for hard disc device 16 serving as a storage section, network control section 18 for communicating with outer terminals through the network, operation display section 19 and memory control section 21, are connected.

The control section 14 is composed of, as main portions, CPU (Central Processing Unit), a flash memory in which a program to be carried out by the CPU is stored and RAM (Random Access Memory) that is used as a work memory for CPU practicing the program. A magnetic disc device capable of storing a large amount of data is used for the hard disc device 16. A hard disc device of another type such as a magneto-optical disc can also be used for the hard disc device 16. A data storage apparatus relating to the invention is mainly composed of control section 14, HDD control section 17 and hard disc device 16.

The operation display section 19 is composed of a liquid crystal display, a touch panel formed on the surface of the liquid crystal display and other operation switches. On the liquid crystal display, there are displayed various types of operation screens, guide screens and caution screens. It is further arranged so that various types of instructions are received from a user through the touch panel and operation switch.

Under the memory control section 21, there are connected buffer memory 22 that stores image data temporarily and compression extension section 23 that compresses and extends image data. A semiconductor memory capable of accessing at high speed is used for the buffer memory 22.

The memory control section 21 fulfills a function to control image data writing operations and reading operations for buffer memory 22, and to control input and output operations of data for compression extension section 23. Image data outputted by scanner section 11 are inputted in memory control section 21. Image data for print output are supplied from memory control section 21 to printer section 12.

Copying operations and printing operations in the image processing apparatus 10 of the structure of this kind, are realized by conducting, in parallel with each other, reading operations to transfer the image data to hard disc device 16 in succession and print output operations to read image data on stored pages from hard disc device 16 to buffer memory 22 and to output them to printer section 12 in succession through memory control section 21 after extending them with compression extension section 23 after compressing image data obtained by reading a document on scanner section 11, or image data inputted from unillustrated outer terminals through network control section 18 to store them in buffer memory 22 temporarily.

Figure 2:
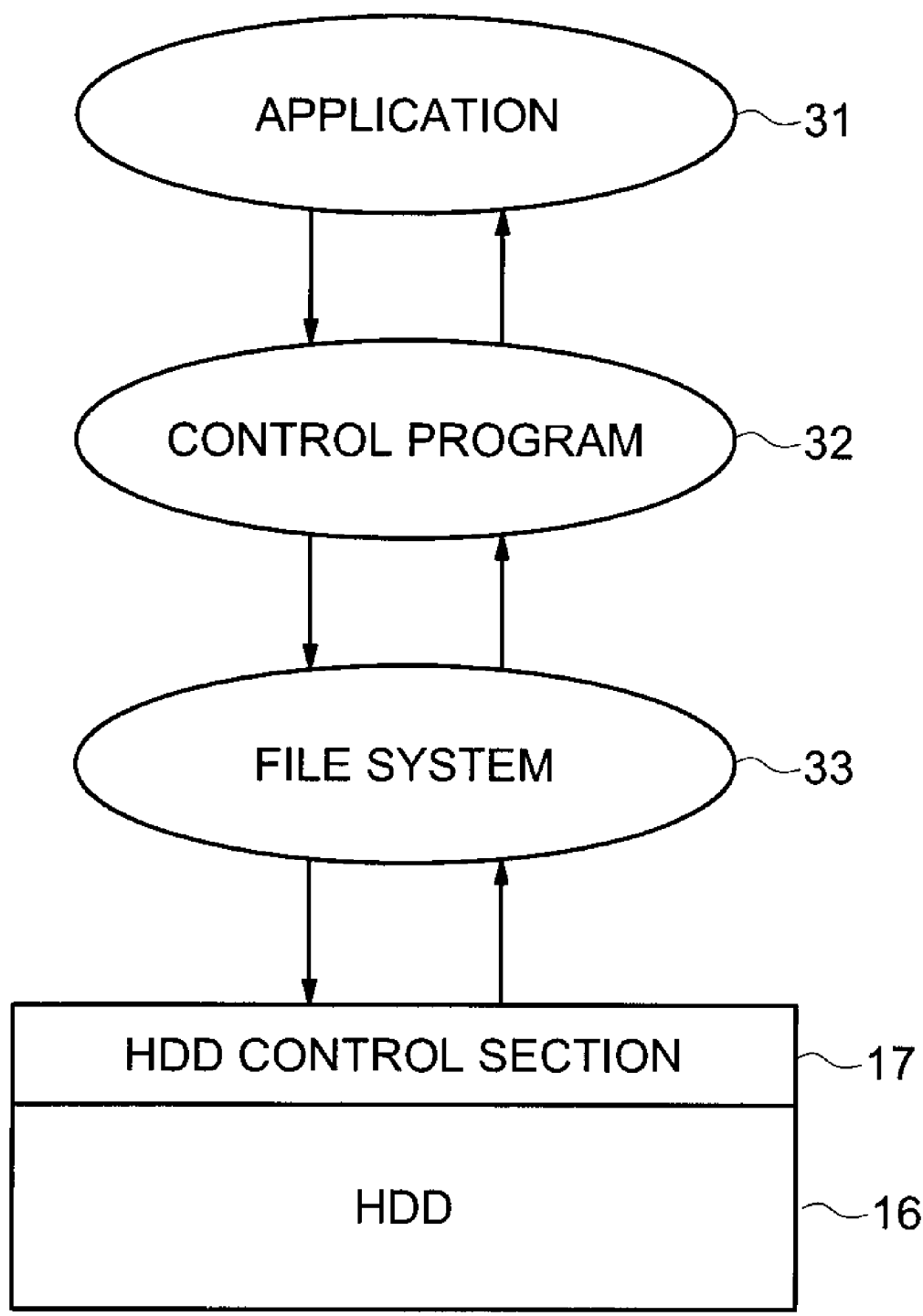
FIG. 2 is an illustration showing a schematic structure of a program relating to data storage, reading and deletion for a hard disc device, among programs practiced by a control section of an image processing apparatus relating to an embodiment of the invention.

FIG. 2 shows a layered structure for the programs relating to data storage, reading and deletion for hard disc device 16 among programs to be practiced by control section 14. Application 31 that controls copying operations and printing operations on an overall basis conducts instructions for data storage, reading and deletion for hard disc device 16 to control program 32, while, control program 32 outputs further detailed instructions to file system 33, responding to the instructions received from application 31. The file system 33 outputs instructions to HDD control section 17 for data reading and instructions for data writing to hard disc device 16, responding to the instructions received from control program 32. Based on the aforesaid instructions, HDD control section 17 controls hard disc device 16 actually, whereby, reading and writing of data are carried out.

File system 33 is a file system employing FAT 32 (File Allocation Table 32), NTFS (NT File System) and EXT 2/3 or the like, and it controls a storage area of hard disc device 16 by using control information registered in FAT or the like, and it conducts preparation, deletion and movement of a file and a directory. When deleting a file by file system 33, only control information is changed, and substantive data of the file stored in hard disc device 16 are not eliminated. For this problem, control program 32 conducts processing for eliminating the substantive data of the file which will be described later.

Figure 3:
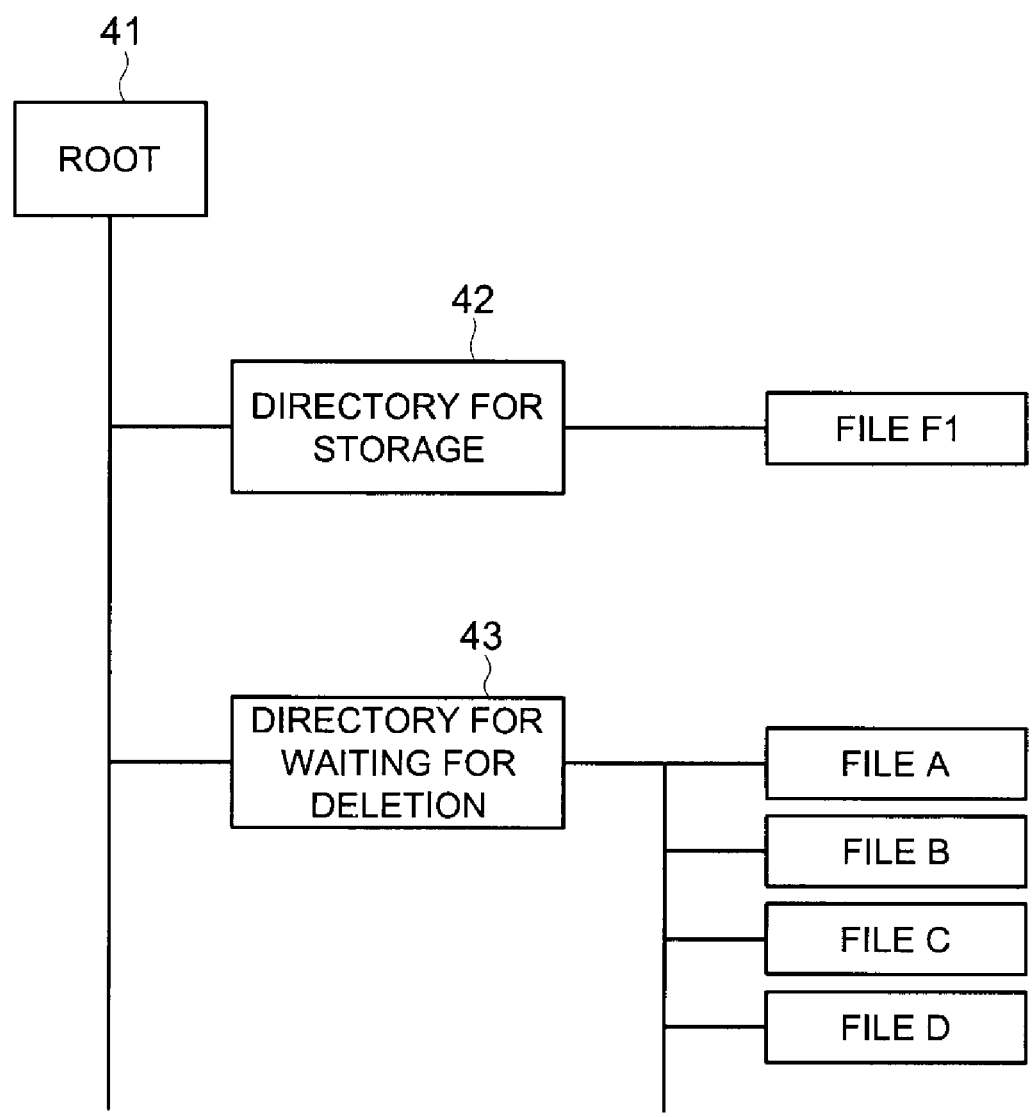
FIG. 3 is an illustration showing an example of a directory structure built in a hard disc device of an image processing apparatus relating to an embodiment of the invention.

FIG. 3 shows an example of the directory structure built in hard disc device 16. Under root 41, there are prepared directory for storage 42 for storing a file and directory for waiting for deletion 43 for storing a file waiting for deletion. Control program 32 in FIG. 2 is arranged to move a file for which instruction for deletion has been received to a position under directory for waiting for deletion 43, if it receives the instructions to delete a file from application 31. In the example in FIG. 3, four files A, B, C and D exist under the directory for waiting for deletion to be in the state of waiting for deletion.

Figure 4:
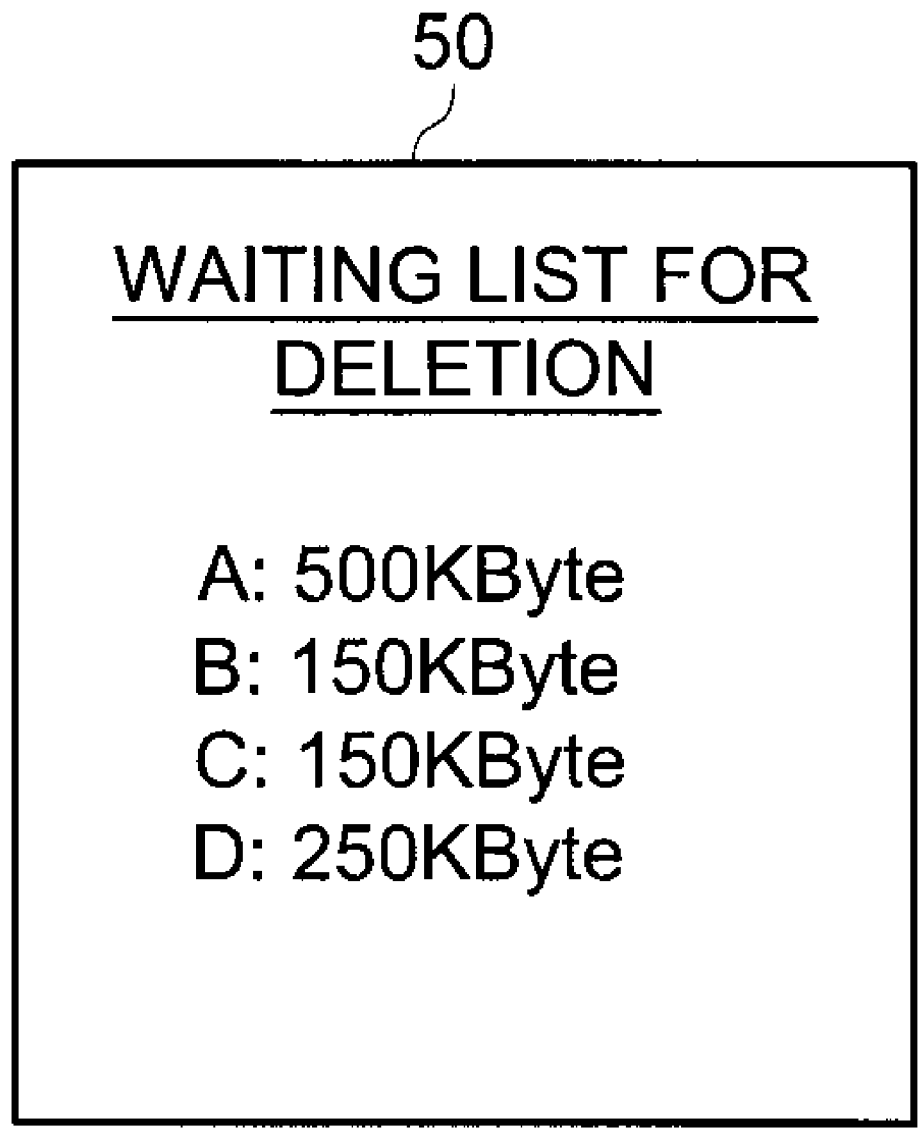
FIG. 4 is an illustration showing an example of a waiting list for deletion made by an image processing apparatus relating to an embodiment of the invention.

As shown in FIG. 4, the control program 32 prepares and controls waiting list for deletion 50 wherein information (file information) concerning a file waiting for deletion existing under directory for waiting for deletion 43 is listed. Information in which a file name and size information are correlated concerning files waiting for deletion existing under directory for waiting for deletion 43 are registered on the waiting list for deletion 50, in the order from the forefront of the list so that the file for which the instruction for deletion has been received earliest comes first. After receiving the instruction for deletion of the file from application 31, the control program 32 registers file information of that file at the last end of the waiting list for deletion 50 additionally. Waiting list for deletion 50 may be stored either on an unillustrated RAM in control section 14, or in the hard disc device 16. Waiting list for deletion 50 shown in FIG. 4 corresponds to the state of file waiting for deletion shown in FIG. 3, and file information for four files A, B, C and D are registered on waiting list for deletion 50.

Figure 5:
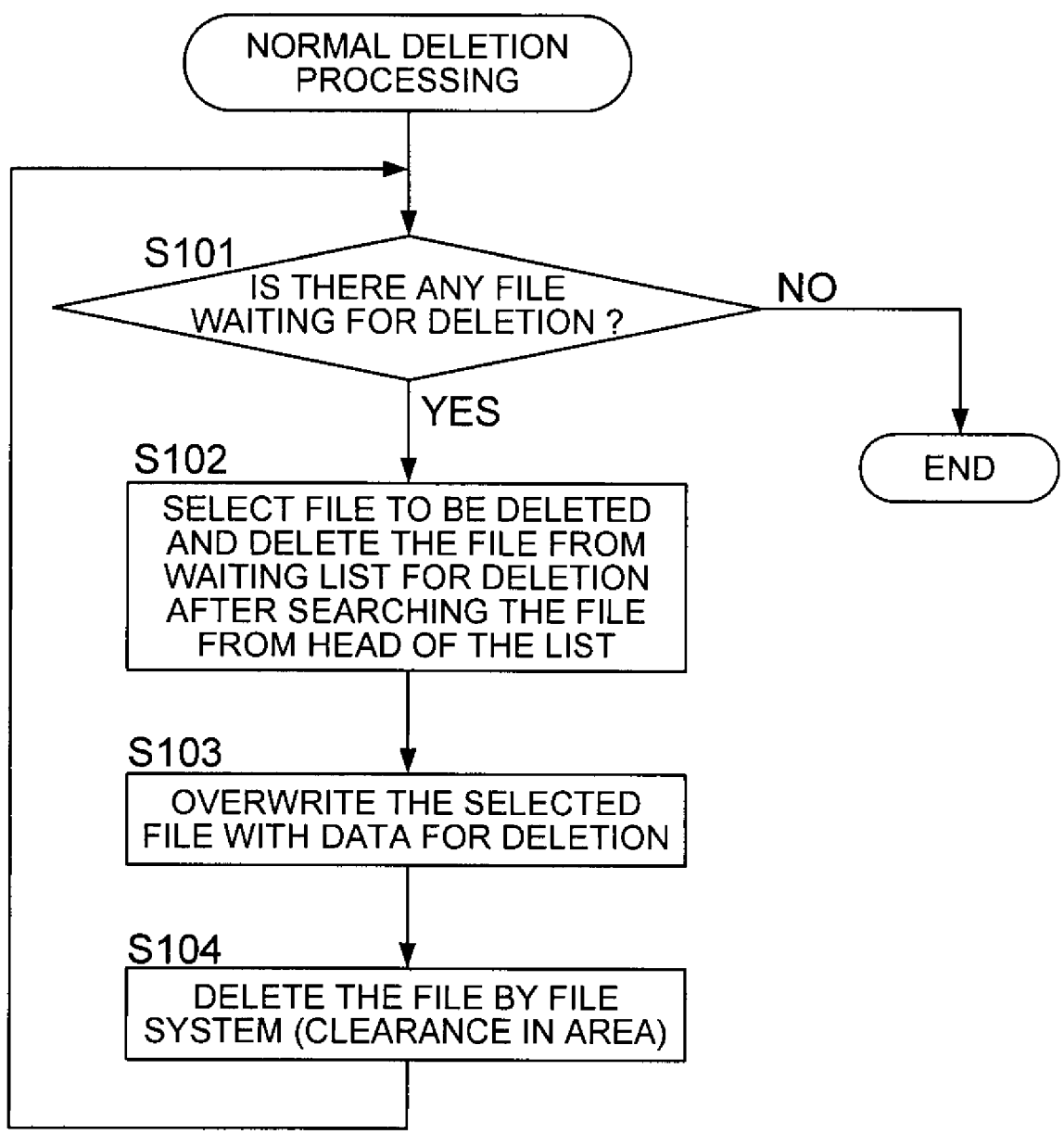
FIG. 5 is a flow chart showing a flow of ordinary deleting processing which is conducted by an image processing apparatus relating to an embodiment of the invention.

FIG. 5 shows a flow of normal deletion processing conducted by control program 32. This processing is practiced after the instruction for deletion is received from application 31 and the file is registered additionally on waiting list for deletion 50, or this processing is practiced constantly and repeatedly. Control program 32 investigates whether a file waiting for deletion exists or not, referring to waiting list for deletion 50, and when no file waiting for deletion exists (step S101; N), the control program 32 brings the processing to an end, while, when the file waiting for deletion exists (step S101; Y), the control program 32 searches for the file, beginning from the forefront of the waiting list for deletion 50. Then, the control program 32 selects the file capable of being deleted which was found first, as the file to be deleted, and deletes file information of that file from the list 50, to advance each of the order in the list by one (step S102). Usually, the file on the forefront of the waiting list for deletion 50 is selected to be deleted. However, if the forefront file cannot be deleted for some reason such as conflict with another processing, the file on the next order is retrieved.

After that, the whole of the file selected to be deleted is overwritten using data for elimination such as "all-zeros" (step S103). Overwriting by the data for elimination is carried out when an instruction of writing data in which the data for elimination is used as data for writing is outputted to file system 33 from control program 32, and the file system 33 operates by following the instruction. After the overwriting by the data for elimination is completed, an instruction for deletion of the file is outputted to the file system 33 (step S104). The file system 33 that has received the instruction for deletion updates control information such as FAT 32 so that the file may turn out to be in the state of deletion. The control program 32 returns again to step S101 to repeats the aforesaid processing as far as other files waiting for deletion exist (step S102-S104).

Next, operations of the control program 32 in the case of receiving an instruction for storage from application 31 will be described as follows, based on FIG. 6. The instruction for storage coming from application 31 includes information (locations and sizes) concerning data to be stored (input data), a directory name and a file name of storage destination that stores the input data. After receiving the instruction for storage from application 31, the control program 32 refers to waiting list for deletion 50 and checks whether a file waiting for deletion exists or not. When no file waiting for deletion exists (Step S201; N), the control program 32 prepares a new file having a name designated by the instruction for storage under a directory of storage destination designated by the instruction for storage from application 31, and stores input data designated by the instruction for storage in the new file (step S202) to terminate the processing.

When a file waiting for deletion exists (Step S201; Y), on the other hand, the file registered on the last end of the waiting list for deletion 50 is selected as the file for overwriting, and the file is moved to a position under the directory of storage destination designated by the instruction for storage from a position under directory for waiting for deletion 43, and the file name is changed to the name designated by the instruction for storage (step S203). At this time, file information of that file is deleted from directory for waiting for deletion 43.

Figure 7:
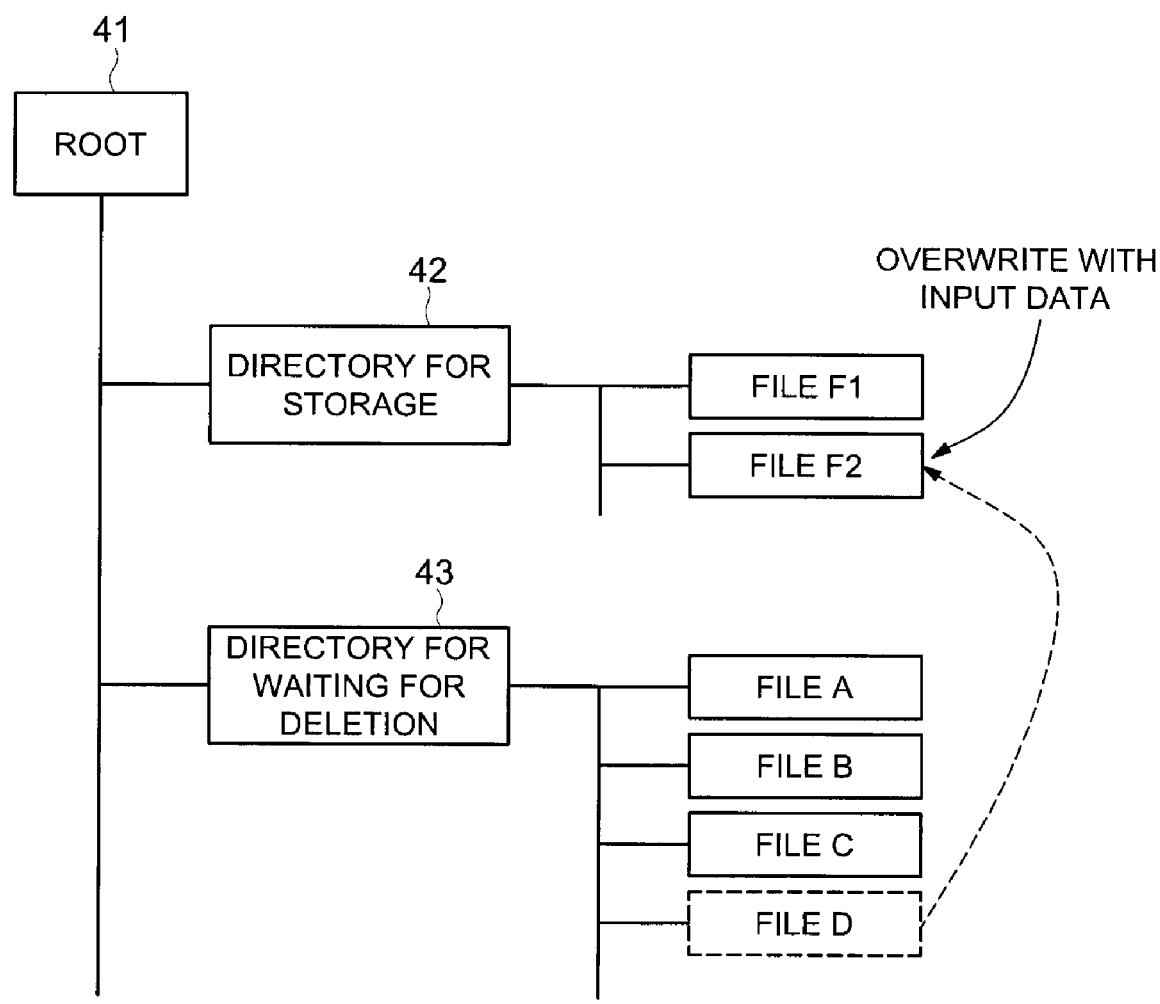
FIG. 7 is an illustration wherein a file waiting for deletion is moved, and how the file is overwritten after renaming using inputted data is exemplified on the directory structure.

Next, the file which has been moved and has been changed in terms of a name is overwritten using the input data designated by the instruction for storage (step S204). Owing to operations of this overwriting, storage of the input data can bring concurrently the destruction work for contents of the file waiting for deletion, thus, file deletion of high securities can be conducted efficiently. FIG. 7 shows the situation wherein the file D registered on the last end of the waiting list for deletion 50 shown in FIG. 4 is moved from a position under directory for waiting for deletion 43 to a position under directory for storage destination 42 designated, then, a file name is changed to "F2", and the file F2 is overwritten by input data to be stored.

The overwriting operations stated above are conducted until completion of overwriting by input data to the last end of the file or completion of storage of the whole of input data designated by the instruction for storage, which is earlier is attained. After the aforesaid overwriting operations are terminated, when a size of the file overwritten is the same as that of input data designated by the instruction for storage (step S205; Y), the processing is terminated.

When a size of the overwritten file is greater than a size of the input data designated by the instruction for storage (step S206; Y), an area, where data are not overwritten and which is equivalent in terms of size to a difference between both sizes, remains in the file. Therefore, the file is truncated (step S207) and the processing is terminated, after overwriting the area remaining without being overwritten with data for elimination such as "all-zeros". On the other hand, when a size of the input data designated by the instruction for storage is greater than a size of the file (step S206; N), the file is expanded by an amount equivalent to a difference between both sizes, and remaining input data are written in the expanded area (step S208) to terminate the processing.

As stated above, in the storage processing, the file waiting for deletion which has not yet subjected to deletion processing is made to be an object for overwriting of input data, separately from normal deletion by deletion processing. Therefore, deletion processing and storage processing by means of overwriting of input data can be practiced independently of each other, and each processing can be simplified.

Though the file on the last end of directory for waiting for deletion 43 is selected to be the file for overwriting, in step S203 of storage processing in the aforesaid example, operations to expand the file (step S208 in FIG. 6) becomes necessary if a size of input data exceeds a file size. Further, if a file size is greater than a size of input data, processing to overwrite using data for elimination of an amount equivalent to an amount of difference between both sizes (step S207 in FIG. 6) is needed separately, resulting in complicated operations and requirement of processing time.

Figure 8:
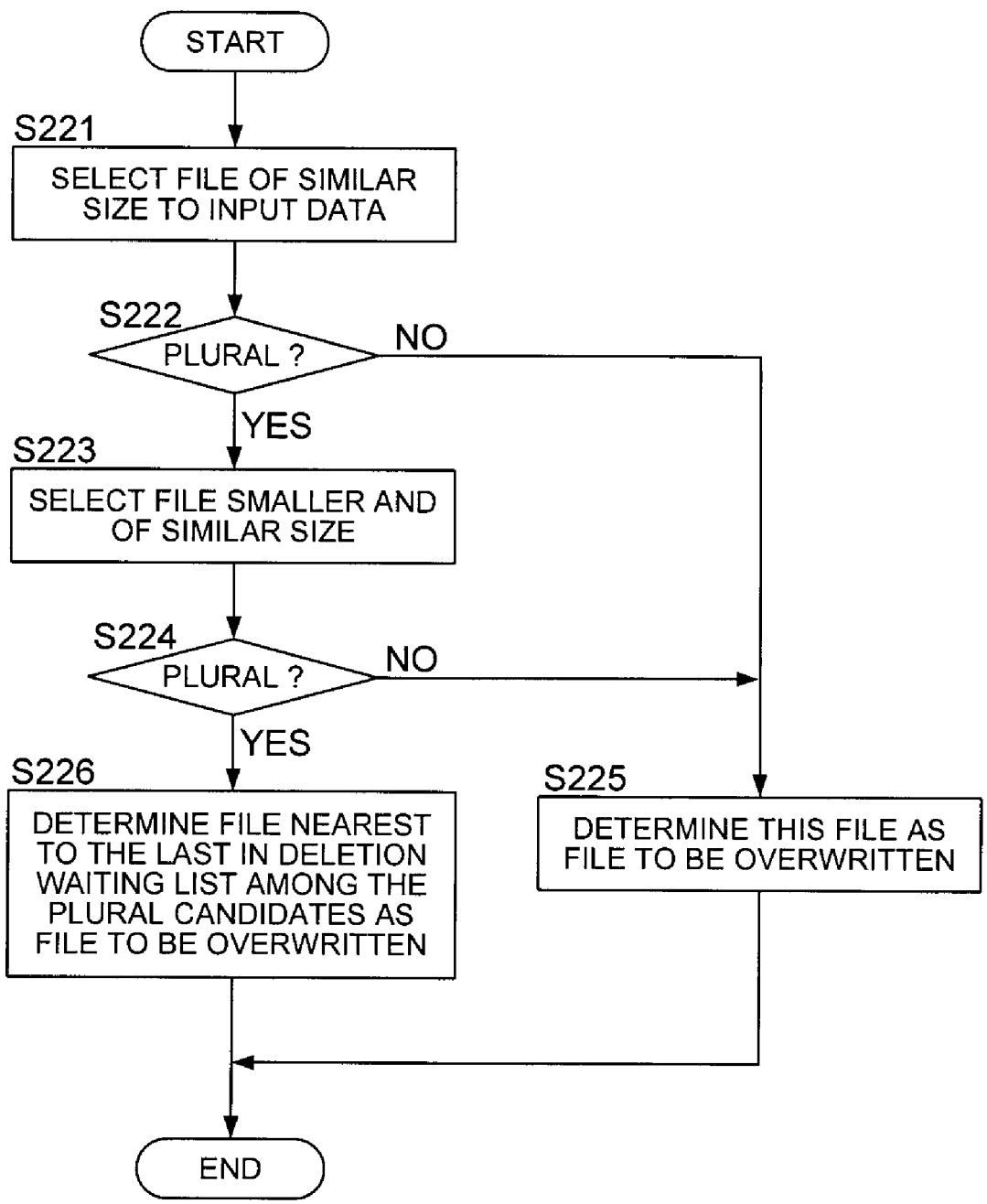
FIG. 8 is an illustration showing a flow of selection processing that selects a file waiting for deletion to be overwritten.

FIG. 8 shows processing for selecting more efficient file as the file for overwriting, when a plurality of files waiting for deletion exist. First, directory for waiting for deletion 43 is referred, and a file waiting for deletion whose size is close to a size of the input data is selected from the directory for waiting for deletion 43 (step S221). With respect to the selection of the file having a size close to that of the input data, the closest one, for example, may be selected, or the closest one and those in which a difference from the closest one is within a prescribed range may be selected.

When the number of files selected as those having close sizes comes to one (step S222; N), this file is determined to be the file to be overwritten (step S225). When the number of files selected as those having close sizes is plural (step S222; Y), a file waiting for deletion whose size is not larger than (not larger than the size of input data) and is close to the size of input data is selected (step S223). When the file can be specified to be one, by limiting the size of the file to be not larger than the size of input data (step S224; N), that specified file is determined to be the file to be overwritten (step S225).

When plural candidate files exist even when limiting the size of the file to be not larger than the size of input data (step S224; Y), the file to be overwritten is determined in the plural candidates in the order that is opposite to the order in which a file to be deleted is selected by normal processing of deletion (step S226). Since the normal deletion processing selects a file, beginning from the forefront of directory for waiting for deletion 43, the file registered to be close to the last end of the directory for waiting for deletion 43 is selected on a priority basis as an opposite order to that in normal deletion processing, in the present example.

For example, if a size of input data is 200 KB when the directory for waiting for deletion 43 is in the registration contents (from the forefront, file A: 500 KB (kilobyte), file B: 150 KB, file C: 150 KB and file D: 250 KB) shown in FIG. 4, files B, C and D are selected as a file having a size close to that of input data, in the aforesaid step S221 (a difference between each of these files and input data is 50 KB). Since plural files are selected, files B and C remain when limiting to be not larger than the size of input data, in step S223. Finally, a decision is made to select file C by giving priority to the last end side in directory for waiting for deletion so that the order may be opposite to that of normal deletion processing.

By selecting the file to be subjected to overwriting by input data from plural files waiting for deletion in the order stated above, storage of overwriting input data can bring more efficiently the destruction work for contents of the file waiting for deletion. In more detailed description, by selecting the file whose size is close to the size of input data from plural files waiting for deletion, an amount of operations of processing to expand the file and to store the data (step S208 in FIG. 6), and an amount of operations of processing (step S207 in FIG. 6) to overwrite data for elimination by an amount equivalent to shortfall of input data can be reduced, and efficiency of actual deletion is improved.

By selecting a file that is not larger than and is close to the size of input data, all of the contents of the file can be destroyed by overwriting with input data, and substantive data of the file waiting for deletion can be eliminated by storage processing for input data. Further, by selecting the file for being overwritten so that the order may be opposite to that for normal deletion processing, conflict and interference between selection of the to be deleted in the normal deletion processing and selection of the file to be overwritten in storage processing, are hardly caused, and files can be selected smoothly in each of normal deletion processing and storage processing.

Embodiments of the invention have been described as stated above, referring to the drawings, and specific structures are not limited to the embodiments, and modifications and additions within a range which does not depart from the spirit and scope of the invention are also included in the invention.

For example, though all files for which an instruction for deletion is received from application 31 were made to be targets for substantial deletion in the embodiment, it is also possible to make only specific files having high confidentiality to be targets for substantial deletion. In the actions to be taken in this case, only files requiring substantial deletion are registered on directory for waiting for deletion 43, and for files requiring no substantial deletion, only control information may be deleted by file system 33.

Further, in the embodiment, when the file targeted to be deleted or the file targeted to be overwritten is selected and determined from waiting list for deletion 50 in normal deletion processing and storage processing, file information of that file was deleted from the waiting list for deletion 50. However, it is also possible to change attribute information of the file to "in course of deletion" (not waiting for deletion) so that the file may be recognized to be in the course of deletion, in place of deleting from the waiting list for deletion 50.

Further, in FIG. 8, a file targeted to be overwritten was selected by using three factors of having a size that is close to the size of input data, having a size that is not larger than and is close to the size of input data and selection in the order opposite to that of normal deletion processing. However, it is not necessary to use all of the aforesaid three factors, and it is also possible, for example, to employ constitution wherein first a file having a size that is not larger than and is close to the size of input data is selected, and if it is impossible to specify one file by the selection, the opposite order is used for the further selection.

Figure 6:
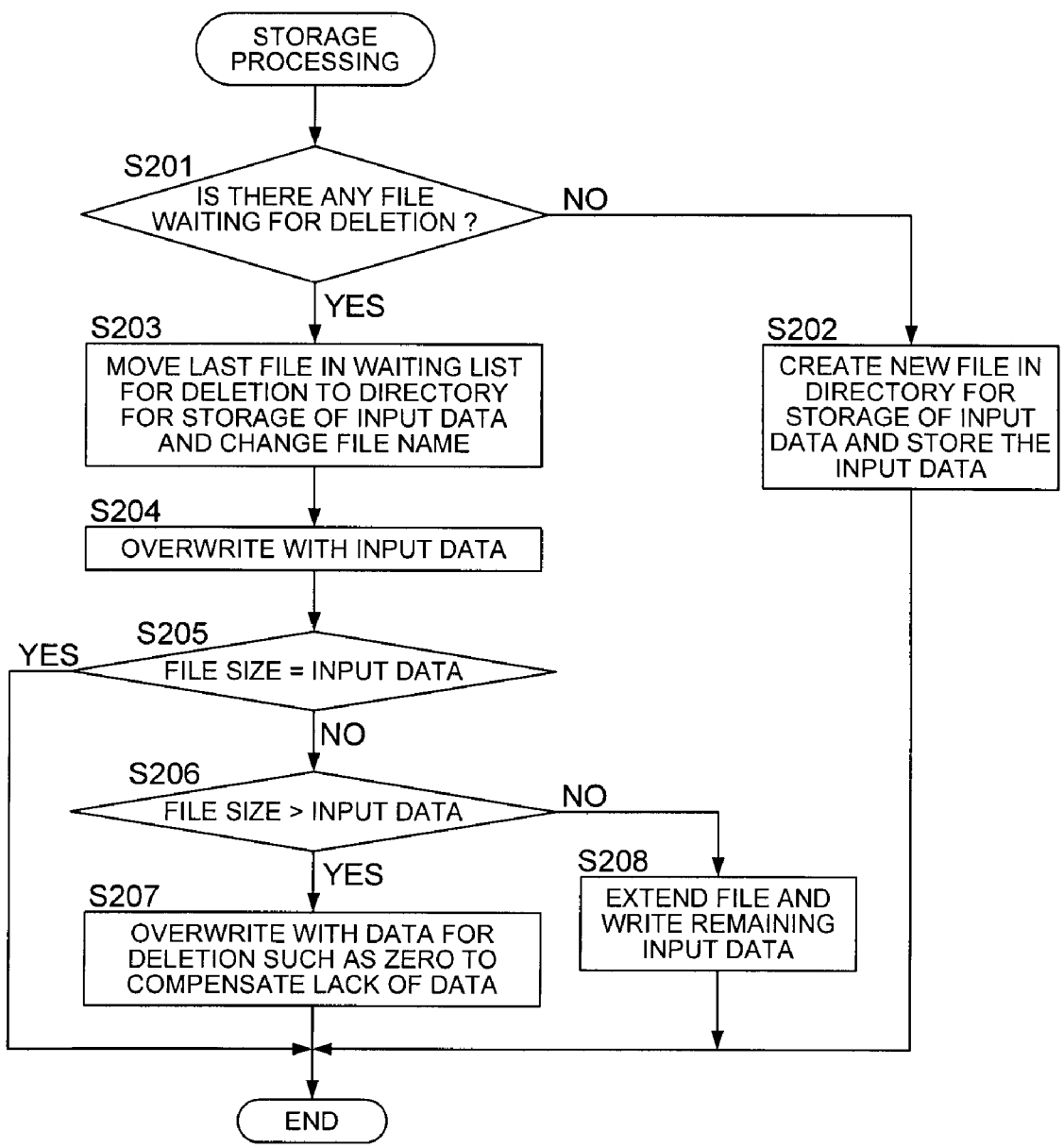
FIG. 6 is a flow chart showing a flow of storage processing which is conducted by an image processing apparatus relating to an embodiment of the invention.

When a file size is greater than a size of input data, data for elimination in quantity equivalent to the shortfall were used for overwriting (S207 in FIG. 6). However, it is also possible to conduct processing to divide an area remaining without being overwritten into a separate file. Further, data for elimination may also be "all-ones" without being limited to "all-zeros", and it may also be a random value to be optional, provided that the contents of the file can be destroyed.

Although the storage section was made to be hard disc device 16 in the embodiment, storage sections of other types may also be employed, provided that the storage sections can store data on a non-volatile basis.

Though image processing apparatus 10 representing a digital copying machine was described as a suitable example in the embodiment of the invention, an application of the invention is not limited to the aforesaid example.

In the data storage apparatus and the data storage method relating to the invention, if files waiting for deletion are existent when storing data newly, any one of the files is overwritten with data to be stored. Owing to this, storage of new data can be a destructive work for contents of the file waiting for deletion concurrently, which makes it possible to delete efficiently the file while preventing leaks of confidential information. It is further possible to practice deletion processing and storage processing by overwriting independently because the file which is not in the course of deletion but is waiting for deletion is selected to be a file for overwriting, resulting in achievement of simplification of processing.

What is claimed is:

1. A data storage apparatus for creating a file of data and for storing the file, the data storage apparatus comprising:
a storage section for storing the data;
a control section for controlling the storage section to store and delete the data; and
a directory for waiting for deletion which is capable of storing a plurality of files waiting for deletion,
wherein when storing the data, the control section judges whether a file waiting to be deleted exists or not in the directory and when the file waiting to be deleted exists, the control section overwrites the waiting file with the data to be stored.

2. The data storage apparatus of claim 1,
wherein when the file waiting to be deleted does not exist, the control section creates a new file in a directory for storing and stores input data in the new file.

3. The data storage apparatus of claim 1,
wherein the control section overwrites the file waiting to be deleted with the data, after changing a file name of the file waiting to be deleted.

4. The data storage apparatus of claim 1,
wherein when the size of the file waiting to be deleted is larger than the size of the data to be stored, a part equivalent to the difference between the sizes is overwritten by data for deletion.

5. The data storage apparatus of claim 1,
wherein when a plurality of files waiting to be deleted exist in the directory for waiting for deletion, the control section selects a file waiting to be deleted for being overwritten by the data from the plurality of files, the size of the file being similar to the size of the data.

6. The data storage apparatus of claim 1,
wherein when a plurality of files waiting to be deleted exist in the directory for waiting for deletion, the control section selects a file waiting to be deleted for being overwritten by the data from the plurality of files, the size of the file being smaller than and closest to the size of the data, or smaller than and close to the size of the data within a predetermined range.

7. The data storage apparatus of claim 1,
wherein when a plurality of files waiting to be deleted exist in the directory for waiting for deletion, the control section selects a file to be overwritten by the data in order which is opposite to order in which a file to be deleted is selected from the plurality of files waiting to be deleted in normal deletion processing.

8. The data storage apparatus of claim 1,
wherein the directory for waiting for deletion is configured to be used also for normal deletion processing.

9. A data storage method for storing input data as a file in a storage section, the data storage method comprising steps of:
judging whether a file waiting to be deleted exists or not in a directory for waiting for deletion which is capable of storing a plurality of files waiting for deletion when storing the data as a file; and
overwriting the file waiting to be deleted with the data to be stored when the waiting file exists as a result of the judging.

10. The data storage method of claim 9, further comprising a step of:
storing the input data in a new file by making the new file in a directory for storing when no file waiting to be deleted exists as a result of the judging.

11. The data storage method of claim 9,
wherein the file waiting to be deleted is overwritten with the data after changing a file name of the waiting file in the storing step.

12. The data storage method of claim 9,
wherein when the size of the file waiting to be deleted is larger than the size of the data to be stored, a part equivalent to the difference between the sizes is overwritten with data for deletion in the storing step.

13. The data storage method of claim 9, wherein when a plurality of files waiting to be deleted exist in the directory for waiting for deletion, a file waiting to be deleted is selected to be overwritten by the data from the plurality of files, the size of the file being similar to the size of the data.

14. The data storage method of claim 9, wherein when a plurality of files waiting to be deleted exist in the directory for waiting for deletion, a file waiting to be deleted is selected to be overwritten by the data from the plurality of the files, the size of the file being smaller than and closest to the size of the data, or smaller than and close to the size of the data within a predetermined range.

15. The data storage method of claim 9, wherein when a plurality of files waiting to be deleted exist in the directory for waiting for deletion, a file is selected to be overwritten by the data in order which is opposite to selection order in which a file to be deleted is selected from the plurality of files waiting to be deleted in normal deletion processing for deleting the file by overwriting with prescribed data for deletion.

16. An image processing apparatus for processing image data, the image processing apparatus comprising:
    a storage section for storing input image data;
    a control section for controlling the storage section to store and delete the image data; and
    a directory for waiting for deletion which is capable of storing a plurality of files waiting for deletion,
    wherein when storing the image data, the control section judges whether a file waiting to be deleted exists or not in the directory and when the file waiting to be deleted exists, the control section overwrites the waiting file with the image data to be stored.

17. The image processing apparatus of claim 16, wherein when the file waiting to be deleted does not exist, the control section creates a new file in a directory for storing and stores the input data in the new file.

18. The image processing apparatus of claim 16, which stores image data read by an image reading apparatus or image data sent from outside through a network in the storage section as input image data.

19. The image processing apparatus of claim 16, wherein when a plurality of files waiting to be deleted exist in the directory for waiting for deletion, the control section selects a file waiting to be deleted for being overwritten by the data from the plurality of files, the size of the file being similar to the size of the data.

20. The image processing apparatus of claim 16, wherein when a plurality of files waiting to be deleted exist in the directory for waiting for deletion, the control section overwrites a file waiting to be deleted of latest order to be deleted among the plurality of files by using the image data.

* * * * *